United States Patent [19]

Ward

[11] Patent Number: 5,125,518

[45] Date of Patent: Jun. 30, 1992

[54] INTERLOCKING HANGING SYSTEM

[75] Inventor: William H. Ward, Hughes, Ark.

[73] Assignee: Innovative Accessories, Memphis, Tenn.

[21] Appl. No.: 743,919

[22] Filed: Aug. 12, 1991

[51] Int. Cl.$^5$ .................................. A47F 5/00
[52] U.S. Cl. .......................... 211/87; 211/94
[58] Field of Search ................ 211/87, 88, 71, 94, 211/90

[56] References Cited

U.S. PATENT DOCUMENTS

| | | | |
|---|---|---|---|
| 2,549,110 | 4/1951 | Michael | 244/129 |
| 2,587,912 | 3/1952 | Simpson | 248/223 |
| 2,799,890 | 7/1957 | Stavich | 16/172 |
| 3,179,961 | 4/1965 | Ward et al. | 9/7 |
| 3,197,934 | 8/1965 | Brown | 52/595 |
| 3,633,244 | 1/1972 | Grossman | 16/178 |
| 3,949,960 | 4/1976 | McKee | 248/225 |
| 4,160,570 | 7/1979 | Bridges | 312/245 |
| 4,450,970 | 5/1984 | Shepherd | 211/90 X |
| 4,632,260 | 12/1986 | Hart et al. | 211/87 X |
| 4,694,965 | 9/1987 | Parnell | 211/87 |
| 4,785,946 | 11/1988 | Sorensen | 211/187 |
| 4,852,213 | 8/1989 | Shewchuk | 16/266 |
| 4,891,897 | 1/1990 | Gieske et al. | 211/87 X |

FOREIGN PATENT DOCUMENTS

| | | | |
|---|---|---|---|
| 0295994 | 12/1988 | European Pat. Off. | 211/87 |
| 2189692 | 11/1987 | United Kingdom | 211/87 |

*Primary Examiner*—David M. Purol
*Assistant Examiner*—Sarah A. Lechek
*Attorney, Agent, or Firm*—Walker & McKenzie

[57] ABSTRACT

An interlocking hanging system including a mounting bracket which may be secured to a supporting structure, a support panel which attaches to and hangs from the mounting bracket, and one or more article holders, such as hooks or trays, which attach to and hang from the support panel. The support panel attaches to the mounting bracket, as do the article holders to the support panel, by upwardly extending arcuate hooks which pivotally corkscrew into and mate with horizontal channel structures, each with an inwardly extending lip, on the mounting bracket and support panel, respectively. The mounting bracket, support panel, and article holders are horizontal extrusions, allowing the article holders and support panel to be adjustably positioned horizontally within the support panel and mounting bracket, respectively. A plurality of horizontal channel structures and lips on the support panel allows vertical positioning of article holders as desired, and one or more extension panels, similar to the support panel, may be cascadably hung from the support panel. Non-concentric inner and outer radii of the various horizontal channel structures provide secure attachment at full insertion of the arcuate hooks, yet allow easy removal. The article holders may be removed from one hanging system and taken to another compatible hanging system, allowing transport of items such as bait, nails, etc. from one location to another. The article holders may be removably secured to the support panel using VELCRO or double-sided tape, and the mounting bracket may contain recessed strip lighting for illumination.

13 Claims, 4 Drawing Sheets

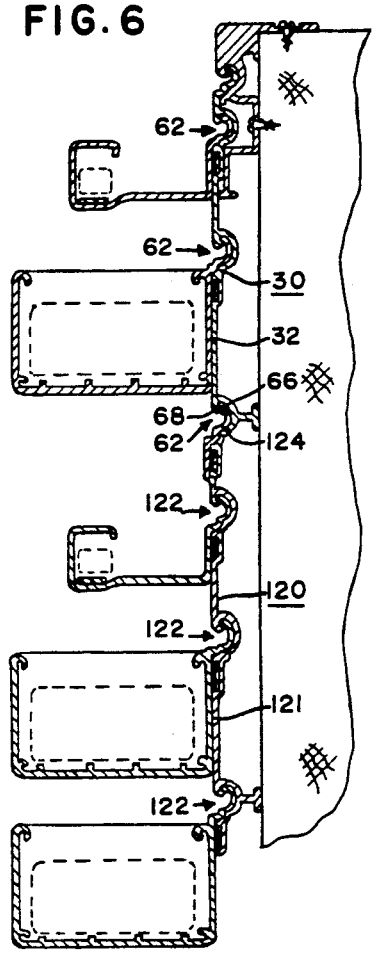
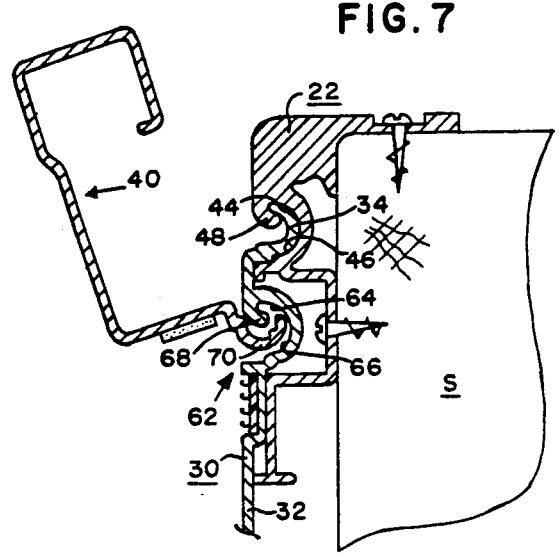
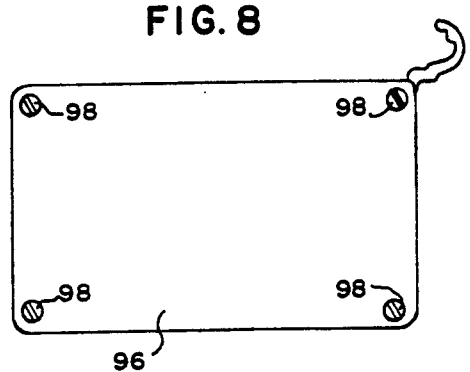
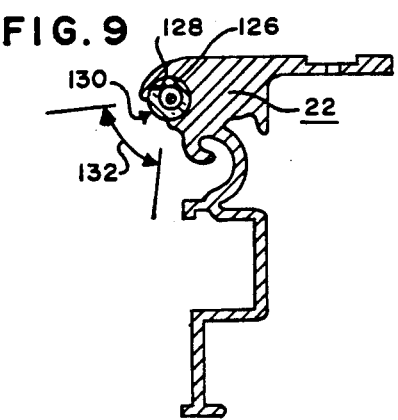
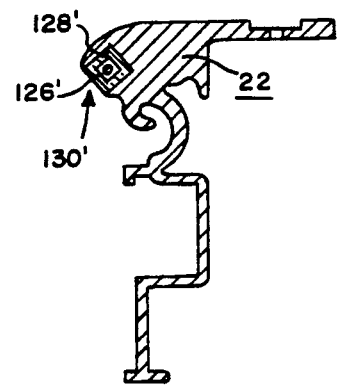

INTERLOCKING HANGING SYSTEM

BACKGROUND OF THE INVENTION

1. Field of the Invention

The present invention relates, in general, to devices for holding articles and hanging them from a structure, and in particular, to removable interlocking mounting systems for hanging articles on walls, vehicles, and other structures.

2. Information Disclosure Statement

Home craftsmen often desire hanging trays or hooks in their workshop to hold tools, nails, screws, and the like, and many craftsmen would appreciate a hanging system for these items that is adjustable and removable. Well known solutions for this problem include "pegboard" type hooks which fit into one of many holes in a wall-mounted board. However, in order to carry such tools, nails, or the like to a remote location, as, for instance, to repair a railing on a boat dock or a fence post, the tools and other hardware must be removed from their wall-mounted trays and carried in a bag or tool box to the remote location. After the repair is completed, the tools and hardware must be replaced in the bag or tool box, carried back to the workshop, and then replaced in the wall-mounted trays. If the repair is performed while atop a ladder, tools and nails are frequently dropped onto the ground, requiring frequent trips up and down the ladder to retrieve the dropped items.

Fishermen have similar problems with bait, fishing lures, thermos bottles, and the like, which might slide around and become damaged when carried on a fishing trip in the back of a pickup truck, and then similarly slide around in the bottom of the fishing boat when the fisherman goes out on the water, often overturning in the water which frequently accumulates in the bottom of the boat.

Likewise, gardeners desire the ability to attach flower boxes to, for instance, outside walls and deck railings. A disadvantage of fixedly attaching flower boxes to such structures is that the cleaning of the flower boxes becomes difficult because they are not easily removable for maintenance, and also that the periodic attention necessary for optimal horticultural endeavors is impeded for a similar reason. If the flower boxes are fixedly attached to a supporting structure, plants are not easily moved as sunlight conditions change, and further, it becomes difficult to bring the plants indoors during inclement weather.

It is therefore desirable to have a compatible system for hanging tools, bait, screws, nails, fishing tackle, or other articles for storage, said system allowing the straightforward removal of the containers holding such items from the storage location and then allowing transport of the items, in the containers, to another location while attached to a compatible second hanging system, and then placed in a compatible third hanging system. It is also desirable that the hanging system be adjustable, allowing adjustable hanging placement of the containers at various positions without the use of tools. While hinging attachment systems are known that are removable, many require the removal and replacement of a hinge pin or screw, thereby mandating the use of tools during disassembly or reassembly. Preferably, a compatible hanging system as desired by fishermen, craftsmen, gardeners, or others, while easily removable, would not become disassembled during use in a vehicle, such as a boat, a pickup truck, or a tractor, which might rock or bounce. It is also desirable that the hinging attachment be substantially secure and rattle-free when fully engaged, yet be easily disengageable for disassembly.

A preliminary patentability search in Class 16, subclasses 260, 265, 266, 269, and 355; Class 403, subclass 353; Class 248, subclasses 220.2 and 222.2; and Class 211, subclasses 88, and 186, as well as subclass 189 unexpired art, produced the following patents, some of which may be relevant to the present invention: Michael, U.S. Pat. No. 2,549,110, issued Apr. 17, 1951; Simpson, U.S. Pat. No. 2,587,912, issued Mar. 4, 1952; Stavich, U.S. Pat. No. 2,799,890, issued Jul. 23, 1957; Brown, U.S. Pat. No. 3,197,934, issued Aug. 3, 1965; Grossman, U.S. Pat. No. 3,633,244, issued Jan. 11, 1972; McKee, U.S. Pat. No. 3,949,960, issued Apr. 13, 1976; Bridges, U.S. Pat. No. 4,160,570, issued Jul. 10, 1979; Parnell, U.S. Pat. No. 4,694,965, issued Sep. 22, 1987; Sorenson, U.S. Pat. No. 4,785,946, issued Nov. 22, 1988; and Shewchuk, U.S. Pat. No. 4,852,213, issued Aug. 1, 1989.

Additionally, Ward et al., U.S. Pat. No. 3,179,961, issued Apr. 27, 1965, describes an adjustable boat seat which may be removably attached to a mounting bracket in a boat.

While each of the above patents disclose various hinging apparatus or interlocking hanging systems, none disclose or suggest the present invention. More specifically, none of the above patents disclose or suggest an interlocking hanging system for attachment to a supporting structure, said hanging system comprising, in combination: a mounting bracket, said mounting bracket comprising: attachment means for securing said mounting bracket to said supporting structure; a transverse lateral arcuate surface forming a substantially horizontal channel; and, a lip member extending downwardly and inwardly into the substantially horizontal channel; said hanging system further comprising: a support panel, said support panel comprising: a vertical panel member, said vertical panel member comprising at least one attachment receptacle, each said attachment receptacle comprising: a transverse lateral arcuate surface forming a substantially horizontal channel; and, a lip member extending downwardly and inwardly into the substantially horizontal channel; said support panel further comprising: an arcuate hook member extending upwardly from said vertical panel member for mating insertion into the substantially horizontal channel of said mounting bracket and for interlocking engagement with the lip member of said mounting bracket; and said hanging system additionally comprising: at least one article holder, each said article holder having an arcuate hook member extending upwardly for mating insertion into the substantially horizontal channel of said at least one attachment receptacle and for interlocking engagement with the lip member of said at least one attachment receptacle.

Michael, U.S. Pat. No. 2,549,110, describes a panel hinge having a barbed hook which mates with a mounting recess, but teaches away from the use of concentric arcs for the interlocking mechanism.

Simpson, U.S. Pat. No. 2,587,912, describes a hinged fixture supporting bracket for soap dishes and towel bars.

Stavich, U.S. Pat. No. 2,799,890, describes a storm sash mounting having a rearwardly opening channel portion which is engaged by a hook-like portion on the storm sash.

Brown, U.S. Pat. No. 3,197,934, describes a joint for metal floor sections with male and female connection means on opposite sides of the floor sections.

Grossman, U.S. Pat. No. 3,633,244, describes an interlocking hinge construction which is assembled by longitudinally sliding one piece of the hinge into the other, but which cannot be rotatably disengaged after assembly.

McKee, U.S. Pat. No. 3,949,960, describes a bracket system for mounting retractable awnings having a tongue and groove joint as well as a keyhole mortise and tenon joint.

Bridges, U.S. Pat. No. 4,160,570, describes wall mounted modules for packaging, merchandising, and storage in which hanging trays hook into wall brackets.

Parnell, U.S. Pat. No. 4,694,965, describes modular panels for a display in which outwardly extending hooks fit into a wall panel.

Sorenson, U.S. Pat. No. 4,785,946, describes a merchandising display system in which a hinging pivot is used to interlock adjacent display panels and shelf units.

Shewchuk, U.S. Pat. No. 4,852,213, describes a pinless releasable extruded hinge.

SUMMARY OF THE INVENTION

The present invention is an interlocking hanging system comprising a mounting bracket for attachment to a supporting structure such as the wall of a house, deck railings, the side wall of a pick-up truck bed, the gunwale of a boat, or a ladder; the hanging system also comprises a support panel which attaches to and hangs from the mounting bracket, and has one or more attachment receptacles from which may be hung one or more article holders. The article holders may be, as needed, fashioned to be hooks on which articles, such as tool boxes or thermos bottles, may be hung, perhaps by their handles, or alternatively the article holders may be variously sized trays for receiving the articles.

Attachment of the support panel to the mounting bracket, as well as of the article holders to the attachment receptacles, is by means of an upwardly extending arcuate hook member on the respective support panel or article holder which engages a lip member which extends downwardly and inwardly into a horizontal channel of the respective mounting bracket or attachment receptacle. The arcuate hook member matingly engages and disengages with the lip member in a "corkscrew" fashion when the hook member is inserted in the horizontal channel as the article holder or support panel is pivotally lowered into and out of its resting position. The lip members and horizontal channels are substantially constant in cross-sectional shape, being preferably formed by an extrusion process, allowing the article holders and support panel to be slidably positioned horizontally as desired. One or more extension panels may be cascaded with the support panel, allowing increasing numbers of attachment receptacles (and therefore, article holders) to be positioned vertically to span a desired region. Each support panel and extension panel preferably has a plurality of vertically spaced attachment receptacles, allowing the article holders to be positioned vertically, as desired, by appropriate choice of a particular attachment receptacle. Preferably, the various horizontal channels are constructed with an outer radius matching the outer radius of the respective mating arcuate hook member, while the smaller inner radius of each lip member is offset and not concentric with the outer radius, giving greater tolerance for removal of the arcuate hook member while securely holding the hook member at full insertion.

Means are described for optionally removably securing the article holders in interlocked position to the support panel, thus preventing the inadvertent disassembly of the hanging system as might happen, for instance, during rocking or bouncing of a vehicle in which the hanging system is employed, and provision is optionally made for including strip lighting in a channel within the mounting bracket. In the preferred embodiment, the mounting bracket, support panel, and article holders are extrudably formed from aluminum or other similar material.

By providing compatible mounting brackets for attachment to various different structures, such as the wall of a workshop or the gunwale of a boat, article holders or support panels may be removed, with or without their contents, from the respective support panel or mounting bracket of one structure and transported to that of another, allowing, for instance, a tray of nails to be carried to a remote location for a repair operation at that remote location, or for bait to be carried on a fishing trip.

It is an object of the present invention to provide an adjustable interlocking hanging system on which article holders may be adjustably and removably positioned vertically and may further be adjustably, removably, and slidably positionable horizontally. It is a further object that the article holders may be removed from one hanging system and then attached to another compatible hanging system, for convenience in transporting items such as tools, bait, screws, nails, or fishing tackle from a storage location to a place of use. Removal and replacement of article holders should be possible without the use of tools, and is facilitated by the lack of pins, such as are commonly found in other hinges and hingeable attachment systems.

BRIEF DESCRIPTION OF THE DRAWINGS

FIG. 6 is a sectional view of the present invention showing an extension panel attached to the support panel and extending downwardly therefrom.

FIG. 7 is a sectional view of a portion of the present invention, showing the insertion and removal of an article holder.

FIG. 8 is an end view of an article holder, showing an end plate which forms a tray compartment.

FIG. 9 is a sectional view of an alternate embodiment of the mounting bracket of the present invention, showing a circular light tube within a channel.

FIG. 10 is a sectional view of an alternate embodiment of the mounting bracket of the present invention, similar to FIG. 9, showing a square light tube within a channel.

DESCRIPTION OF THE PREFERRED EMBODIMENT

Figure 4:
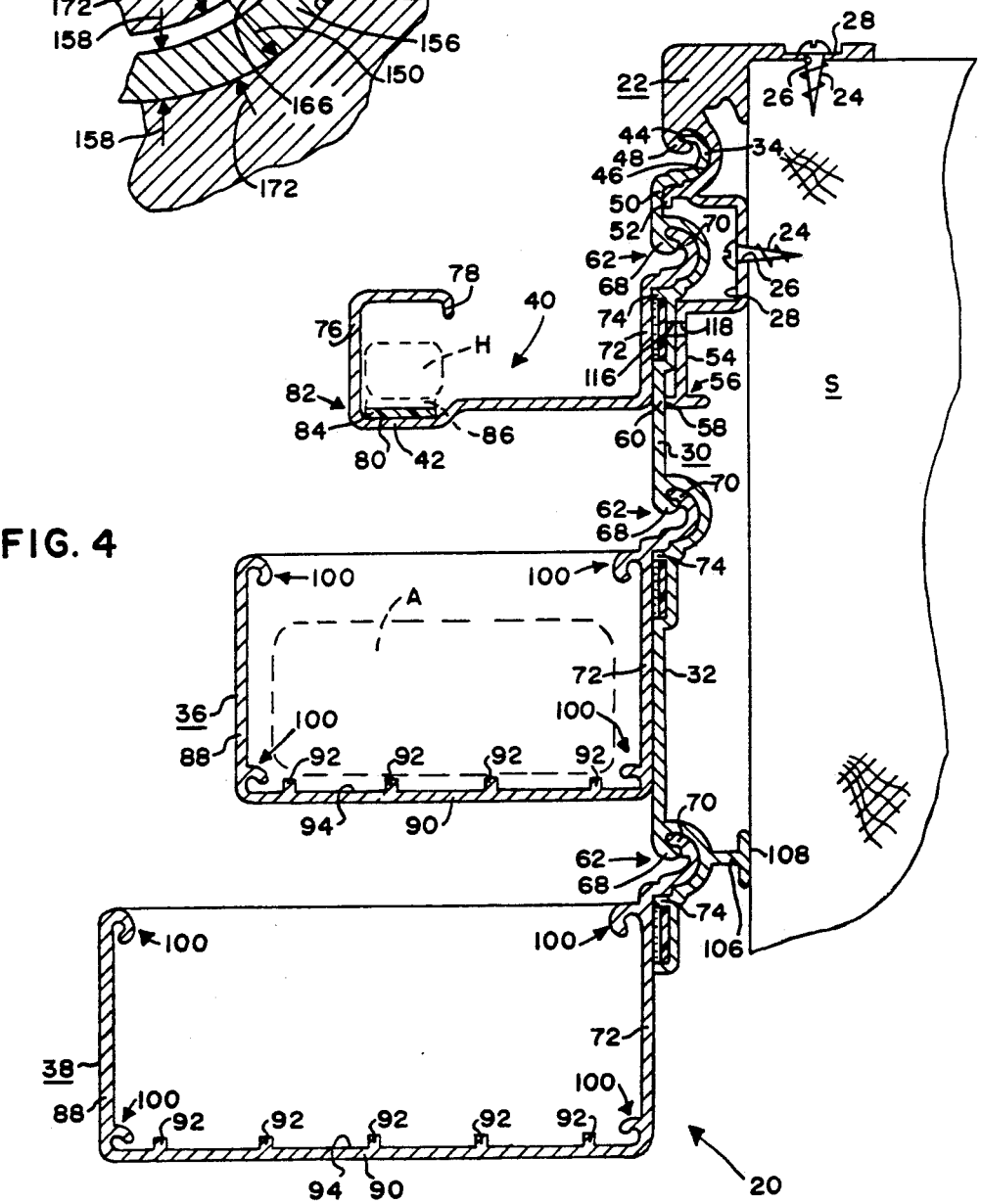
FIG. 4 is a sectional view of the present invention showing three article holders.
Figure 5:
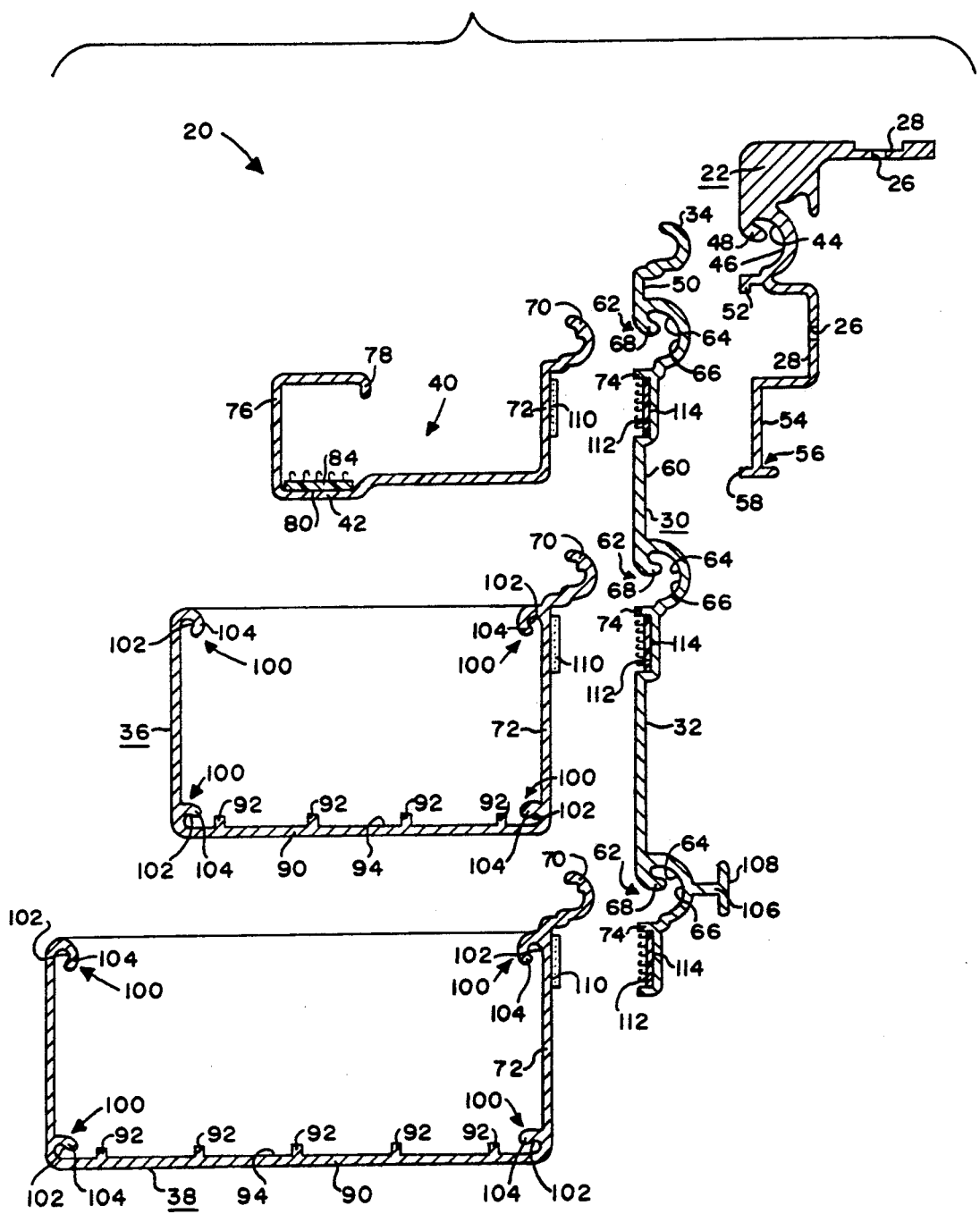
FIG. 5 is a sectional view of the present invention, similar to FIG. 4, but with the various pieces separated for clarity.

Referring to FIGS. 4 and 5, the interlocking hanging system 20 is seen to comprise a mounting bracket 22 secured to a supporting structure S by attachment means such as one or more nails, rivets, or screws 24. Screws 24 may be inserted through holes such a holes 26 in recessed channels 28.

Hanging system 20 also comprises a support panel 30 which, in turn, comprises a vertical panel member 32 and an arcuate hook member 34 extending upwardly from vertical panel member 32 for engagement with mounting bracket 22 in a manner that will be hereinafter explained in detail.

Hanging system 20 is also seen to comprise one or more article holders such as small tray 36 or large tray 38 for holding an article A, or such as accessory hook 40 having an outwardly extending hanging member 42 on which the handle H of, for instance, a thermos bottle or a tool box, may be hung.

Preferably, as shown in FIGS. 4 and 5, each of mounting bracket 22, support panel 30, accessory hook 40, and small and large trays 36 and 38 have a substantially constant cross-sectional shape, allowing them to be extrudably formed in a manner well known to those skilled in the art from aluminum, plastic, or other extrudable materials.

Mounting bracket 22 is seen to also comprise a transverse lateral arcuate surface 44 forming a substantially horizontal channel 46. Mounting bracket 22 also comprises a lip member 48 extending downwardly and inwardly into substantially horizontal channel 46.

As shown in FIG. 5, arcuate hook member 34 of support panel 30 may be matingly inserted, in interlocking engagement with lip member 48 of mounting bracket 22, into channel 46, allowing support panel 30 to hang in downward attachment from mounting bracket 22, preferably having an upper portion 50 for resting contact with upper shoulder 52 of vertical panel member 32 when arcuate hook member 34 is in interlocking engagement with lip member 48 of mounting bracket 22.

Figure 1:
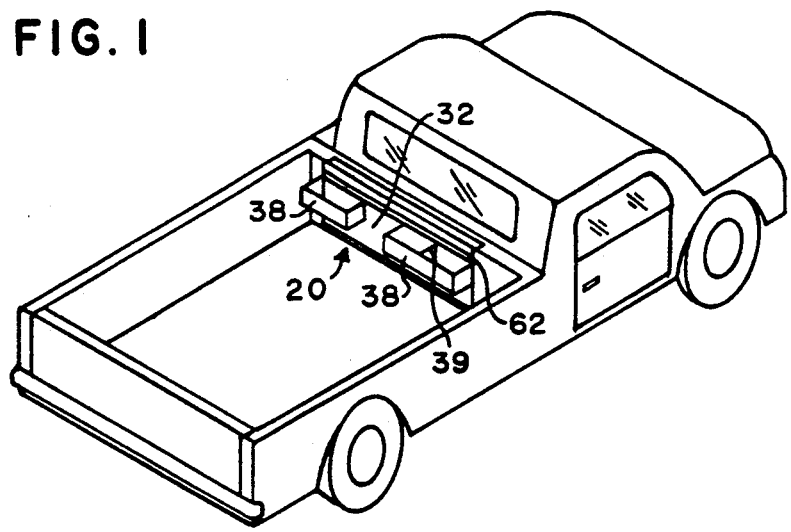
FIG. 1 is a view of the present invention configured with two article holders in the rear of a pickup truck.
Figure 2:
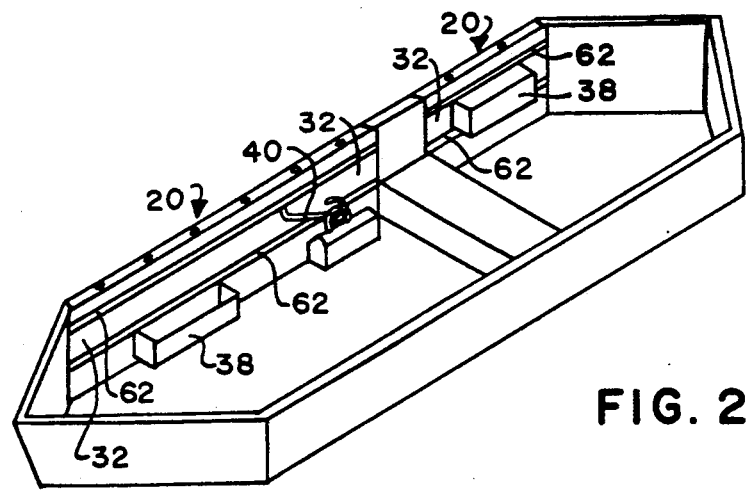
FIG. 2 is a view of the present invention configured with three article holders variously arranged on the side of a boat.
Figure 3:
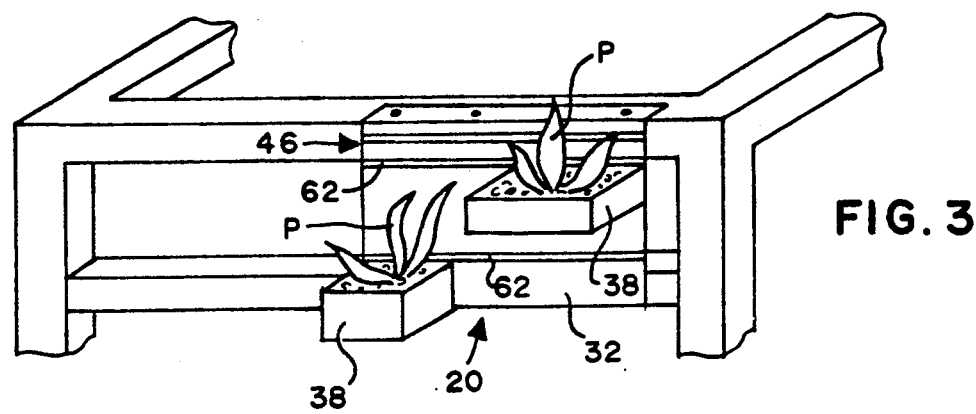
FIG. 3 is a view of the present invention attached to a deck railing, with two article holders shown with plants therein.

Mounting bracket 22 may also comprise a downward vertical portion 54 which includes stiffening means for increasing the structural rigidity of mounting bracket 22; the stiffening means preferably comprises an inverted-T extrusion 56 formed as an integral part of mounting bracket 22, and having a lower shoulder 58 for resting contact with intermediate portion 60 of vertical panel member 32 when arcuate hook member 34 of support panel 30 is in interlocking engagement with lip member 48 of mounting bracket 22. Stiffening of mounting bracket 22 helps preserve the shape of channel 46 over distances spanned by mounting bracket 22, as for instance, as shown in FIGS. 1-3, thereby preventing the binding that might otherwise occur with hook member 34 were mounting bracket 22 to substantially bend or flex.

Vertical panel member 32 is seen to include one or more attachment receptacles 62 to which may be attached various article holders such as small tray 36, large tray 38, or accessory hook 40 in a manner that will be hereinafter described. Each attachment receptacle 62 preferably comprises a transverse lateral arcuate surface 64 forming a substantially horizontal channel 66. Each attachment receptacle 62 also comprises a lip member 68 extending downwardly and inwardly into substantially horizontal channel 66. It will be understood that transverse lateral arcuate surface 44, substantially horizontal channel 46, and lip member 48 of mounting bracket 22 are preferably similar in construction and operation to transverse lateral arcuate surface 64, substantially horizontal channel 66, and lip member 68 of each attachment receptacle 62.

Each article holder, such as accessory hook 40 and small and large trays 36 and 38, comprises a arcuate hook member 70 extending upwardly from rear side 72 of said article holder for mating insertion into a substantially horizontal channel 66 of an attachment receptacle 62 and for interlocking engagement with the lip member 68 of that attachment receptacle 62. Preferably, there may be a resting shoulder 74 on vertical panel member 32, preferably adjacent each attachment receptacle 62, for resting contact with rear side 72 of the article holder attached to that attachment receptacle 62.

Outwardly extending hanging member 42 of accessory hook 40 has a hook portion 76 extending upwardly and rearwardly, preferably with a downwardly extending lip 78, for receipt and capture of the handle H of an article such as a tool box or a thermos bottle. It should be understood that hook portion 76 may be appropriately shaped, as desired, to hold other articles such as a shotgun or a fishing rod. Hanging member 42 has an article resting region 80, partially enclosed by hook portion 76, on which article securing means 82 for removably attaching a portion of an article, such as handle H, may be located. Article securing means 82 may be chosen to be a length of double-sided tape or loop-and-pile coacting fastening means such as is sold under the trademark VELCRO, with preferably a portion of loop material 84 attached to resting region 80 and a coacting portion of pile material 86 attached to a portion of the article such as handle H.

Small tray 36 and large tray 38 each have a front side 88 and a bottom 90, with bottom 90 preferably having one or more ribs 92 for stiffening the respective tray and for additionally providing a resting position for an article, such as article A, which is suspended above the surface 94 of bottom 90, thereby keeping article A out of water which may accumulate in the bottom of tray 36 or 38 during outside use, as in a boat or pickup truck. Trays 36 and 38 also preferably have a left and a right side, such as side 96 shown in FIG. 8, secured to tray 36, 38 by securing means such as screws 98, preferably four in number for each side, through side 96, tapping into screw bosses 100 of trays 36, 38, in a manner that will now be apparent. Screw bosses 100, well known to those skilled in the art, are preferably extrudably formed at the top and bottom of front and rear sides 88, 72, of trays 36, 38, and provide a screw tapping region 102 formed by lips 104.

Additionally, support panel 30 preferably has a support brace 106 attached to vertical panel member 32, and preferably located behind an attachment receptacle 62, for spacing support panel 30 a distance from supporting structure S. Support brace 106 is preferably a T-shaped extrusion, and also may have a flat surface 108, for contact with supporting structure S, on which securing means, such as double-sided tape or the like, may be attached, in a manner that will now be apparent, for removably securing support panel 30 to structure S, thereby reducing any vibration or rattling of support panel 30 that might otherwise occur as, for instance, if structure S were part of a boat or truck.

In the preferred embodiment, each article holder 36, 38, 40, preferably comprises means for removably securing the rear side 72 of each respective article holder to support panel 30. This means for removably securing rear side 72 may be, for example, double-sided tape or loop-and-pile coacting fastening means such as is sold under the trademark VELCRO, with preferably a portion of pile material 110 attached to rear side 72 and a coacting portion of loop material 112 attached within a channel 114 formed in vertical panel member 32 for mating engagement between loop 112 and pile 114. Although not required, support panel 30 may be securely attached to mounting bracket 22 by, for instance, drilling mating holes, such as holes 116 and 118, through panel 32 and portion 54, see FIG. 4, and inserting a screw or other fastening means, not shown, therethrough to secure panel 30 to bracket 22 in a manner that will now be apparent.

In operation, an article holder, such as accessory hook 40, is inserted, as shown in FIG. 7, by placing arcuate hook member 70 within horizontal channel 66, with the article holder at an angle, and then pivotally lowering the article holder so that hook member 70, operating in a "corkscrew" fashion with respect to attachment receptacle 62, becomes matingly and interlockingly engaged with lip member 68 in a manner that now will be understood. Removal is the merely the reverse of this procedure. Typically, an article holder, such as accessory hook 40, must be pivoted through an angle of about seventy to ninety and typically eighty to eighty-five degrees before removal is possible, thereby ensuring against an article holder inadvertently becoming disengaged with its attachment receptacle when, for instance, supporting structure S rocks or sways, since the force of gravity, acting downwardly upon the article holder, will tend to prevent large upward angular pivotal motion thereof.

As shown in FIG. 1–3, attachment receptacles 62 preferably run horizontally the length of each vertical panel member 32, and article holders, such as trays 38, may be less in width than panel member 32, allowing, due to the substantially constant cross-sectional shape of panel member 32, the article holders to be selectively positioned horizontally as desired within and along attachment receptacles 62. If desired, and for certain vertical spacings chosen for attachment receptacles 62 and certain heights of, for instance, trays 38, article holders might be positioned directly above one another. Alternatively, the article holders might be positioned not directly above one another, allowing large articles, such as, for instance, the plants P shown in FIG. 3, to be supported by the present invention. When an article holder is pivotally raised, as in FIG. 7, it may be slidably positioned horizontally along attachment receptacle 62, but when lowered, is secured into position by the interlocking engagement of arcuate hook member 70 with lip member 68 and channel 66, as well as by means, such as loop-and-pile coacting fastening means 110 and 112, securing rear side 72 to support panel 30.

There may also be provided one or more extension panels 120, as, for instance, in FIG. 6, each such extension panel preferably similar to support panel 30 and having a vertical panel member 121 which, in turn, includes one or more attachment receptacles 122, each substantially similar to attachment receptacles 62. Extension panel 120 also includes an arcuate hook member 124 extending upwardly from vertical panel member 121 for mating insertion into the substantially horizontal channel 66 of one attachment receptacle 62, preferably the lower-most attachment receptacle, of vertical panel member 32 of support panel 30 for interlocking engagement with the lip member 68 of that attachment receptacle 62. Successive extension panels may similarly be cascaded with a prior extension panel, to create an increasing number of attachment receptacles 62, 122, spanning an increasing vertical distance, in a manner that will now be apparent.

It will be understood that the engagement and disengagement of support panel 32 with mounting bracket 22, as well as that of extension panel 120 with support panel 30, occurs in a similar manner to that of an article holder with an attachment receptacle, due to the preferably similar construction of their respective channels, lip members, and arcuate hook members.

It will be understood that some article holders, such as trays 38 shown in FIG. 1, may be provided with divider panels 39 or lids, not shown, in a manner well known to those skilled in the art, allowing compartmentalized partitioning of the articles within and containment thereof.

Figure 11:
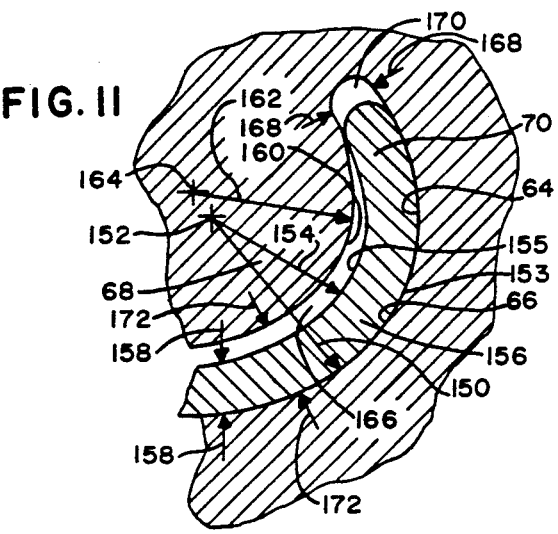
FIG. 11 is a sectional view of a portion of a horizontal channel with a partially inserted portion of an arcuate hook member, showing the offset radii of the horizontal channel.

FIG. 11 shows a sectional view of a portion of a horizontal channel with a partially inserted portion of an associated arcuate hook member. While horizontal channels 66 and hook members 70 were chosen for purposes of illustration, it will be understood that channel 46 and receptacles 122 are preferably similarly constructed. Arcuate surface 64 of associated horizontal channel 66 is preferably defined by a larger outer radius 150 extending from and rotating about point 152 For compatible mating, arcuate hook member 70 is preferably chosen to have outer and inner surfaces, 153 and 155, respectively, each respectively defined by an outer radius which is substantially the same as, and not larger than, outer radius 150, as well as a concentric smaller inner radius 154, causing the tip portion 156 of hook member 70 to have a substantially constant thickness as shown by arrows 158. Lip member 68 has a convex arcuate surface 160 defined by an inner radius 162, smaller than radius 150, extending from and rotating about point 164 which is offset from point 152. It will be understood, therefore, that arcs traced by radii 150 and 162 are necessarily not concentric, and that, as shown, points 164 and 152 are chosen, as are radii 150 and 162, so that the width of cavity 166 defined by surfaces 160 and 64 varies from a narrower first width, shown by arrows 168, at the inner extreme region 170 of cavity 166 to a wider second width, shown by arrows 172, away from inner extreme 170. It should be understood that the narrower first width shown by arrows 168 should be substantially the same as, and not smaller than, the thickness of tip portion 156 of hook member 70, shown by arrows 158, for secure and substantially rattle-free interlocking of hook member 70 with cavity 166 at full insertion of hook member 70 into cavity 166. The larger dimensional tolerances provided at the wider second width, shown by arrows 172, allow easy removal of hook member 70 for disassembly since, once partially removed, the larger tolerances then allow the hook member to freely and easily be completely removed.

Provision may also be made, as shown for instance in FIGS. 9 and 10, for an illumination source on mounting bracket 22. Preferably, as shown in FIG. 9, the illumination source is a cylindrically shaped strip light 126, flexible and with periodically spaced lights, well-known to those skilled in the art, resting within a semi-circular channel 128 formed within mounting bracket 22. Channel 128, in the preferred embodiment, may have an opening 130 spanning an angle 132 less than 180 degrees, permitting strip light 126 to be slidably inserted into channel 128 from one end of mounting bracket 22 and entrapped therein because strip light 126 is wider than opening 130. Mounting bracket 22 may then be installed with opposite ends flush against walls of a structure S, as for instance, opposite walls of a pick-up truck bed or gunwales of a boat, thereby inhibiting the removal and theft of strip light 126 from bracket 22 because it will be impossible to slide strip light 126 out of channel 128, as will now be understood.

Alternatively, the strip light may be a square or rectangularly shaped strip light 126', shown in FIG. 10, resting within a square or rectangularly shaped channel 128' formed within mounting bracket 22. Because opening 130' in channel 128' is substantially the same width as strip light 126', it is necessary to secure strip light 126' within channel 128' using adhesive such as, for instance, silicone caulking or glue. The alternate embodiment shown in FIG. 10 with a square or rectangularly shaped strip light 126' allows mounting bracket 22 to be installed by a manufacturer on, for instance, a pick up truck or boat gunwale, and permits the later installation, by a buyer of such a vehicle, of strip lighting 126'using adhesive, as previously described, without having to remove mounting bracket 22 from the vehicle.

Although the present invention has been described an illustrated with respect to a preferred embodiment and a preferred use therefor, it is not to be so limited since modifications and changes can be made therein which are within the full intended scope of the invention.

I claim:

1. An interlocking hanging system for attachment to a supporting structure, said hanging system comprising, in
    a. a mounting bracket, said mounting bracket comprising:
        i. attachment means for securing said mounting bracket to said supporting structure;
        ii. a transverse lateral arcuate surface forming a substantially horizontal channel; and,
        iii. a lip member extending downwardly and inwardly into the substantially horizontal channel;
    b. a support panel, said support panel comprising:
        i. a vertical panel member, said vertical panel member comprising at least one attachment receptacle, each said attachment receptacle comprising:
            (a) a transverse lateral arcuate surface forming a substantially horizontal channel; and,
            (b) a lip member extending downwardly and inwardly into the substantially horizontal channel; and,
        ii. an arcuate hook member extending upwardly from said vertical panel member for mating insertion into the substantially horizontal channel of said mounting bracket and for interlocking engagement with the lip member of said mounting bracket; and,
    c. at least one article holder, each said article holder having an arcuate hook member extending upwardly for mating insertion into the substantially horizontal channel of said at least one attachment receptacle and for interlocking engagement with the lip member of said at least one attachment receptacle.

2. The hanging system as recited in claim 1 in which said vertical panel member comprises a plurality of said attachment receptacles, and in which said hanging system comprises a plurality of said article holders.

3. The hanging system as recited in claim 2 in which one of said article holders additionally comprises a rear side and an outwardly extending hanging member for receipt of an article.

4. The hanging system as recited in claim 2 in which one of said article holders additionally comprises a rear side, a front side, a left side, a right side, and a bottom for receipt of an article.

5. The hanging system as recited in claim 4 in which the widths of said bottom and said front and rear sides are less than the width of said vertical panel member.

6. The hanging system as recited in claim 3 or claim 4 in which each said article holder additionally comprises means for removably securing the rear side of each said article holder to said support panel.

7. The hanging system as recited in claim 2 in which one of said article holders additionally comprises a rear side, a front side, a left side, a right side, and a bottom for receipt of a first article; and in which another of said article holders additionally comprises a rear side and an outwardly extending hanging member for receipt of a second article.

8. The hanging system as recited in claim 1 in which said support panel additionally comprises a support brace for spacing said support panel a certain distance from said supporting structure.

9. The hanging system as recited in claim 1 in which said mounting bracket additionally comprises a shoulder for resting contact with said vertical panel member when said arcuate hook member extending upwardly from said vertical panel member is in interlocking engagement with the lip member of said mounting bracket.

10. The hanging system as recited in claim 1 in which said hanging system additionally comprises an extension panel, said extension panel comprising:
    a. a vertical panel member, said vertical panel member comprising at least one attachment receptacle, each said attachment receptacle comprising:
        i. a transverse lateral arcuate surface forming a substantially horizontal channel; and,
        ii. a lip member extending downwardly and inwardly into the substantially horizontal channel; and,
    b. an arcuate hook member extending upwardly from said vertical panel member for mating insertion into the substantially horizontal channel of one said attachment receptacle of said vertical panel member of said support panel and for interlocking engagement with the lip member of said one said attachment receptacle of said vertical panel member of said support panel.

11. An interlocking hanging system for attachment to a supporting structure, said hanging system comprising, in combination:
    a. a mounting bracket, said mounting bracket comprising
        i. attachment means for securing said mounting bracket to said supporting structure;

ii. a transverse lateral arcuate surface forming a substantially horizontal channel; and,
iii. a lip member extending downwardly and inwardly into the substantially horizontal channel;
b. a support panel, said support panel comprising:
 i. a vertical panel member, said vertical panel member comprising a plurality of attachment receptacles, each said attachment receptacle comprising:
  (a) a transverse lateral arcuate surface forming a substantially horizontal channel; and,
  (b) a lip member extending downwardly and inwardly into the substantially horizontal channel;
 ii. an arcuate hook member extending upwardly from said vertical panel member for mating insertion into the substantially horizontal channel of said mounting bracket and for interlocking engagement with the lip member of said mounting bracket; and,
 iii. a support brace for spacing said support panel a certain distance from said supporting structure; and,
c. a plurality of article holders, each said article holder comprising:
 i. a rear side;
 ii. means for removably securing the rear side of each said article holder to said support panel; and,
 iii. an arcuate hook member extending upwardly for mating insertion into the substantially horizontal channel of said at least one attachment receptacle and for interlocking engagement with the lip member of said at least one attachment receptacle at a selected position along said substantially horizontal channel of said at least one attachment receptacle;
in which one of said article holders additionally comprises a front side, a left side, a right side, and a bottom for receipt of a first article; and in which another of said article holders additionally comprises an outwardly extending member for receipt of a second article;
further in which said mounting bracket additionally comprises a shoulder for resting contact with said vertical panel member when said arcuate hook member extending upwardly from said vertical panel member is in interlocking engagement with the lip member of said mounting bracket.

12. The hanging system as recited in claim 1 or claim 11 in which said mounting bracket additionally comprises a recessed channel for receipt of a light.

13. The hanging system as recited in claims 1, 7, or 11, in which at least one said transverse arcuate surface forming its associated said substantially horizontal channel is defined by a larger outer radius rotating about a first point, and in which the lip member associated with each said associated substantially horizontal channel comprises a convex arcuate surface defined by an inner radius rotating about a second point, said second point being offset from the first point and chosen so that a cavity, defined by said transverse arcuate surface and said convex arcuate surface, varies in width from a narrower first width at an inner extreme region of the cavity to a wider second width away from said inner extreme region, said narrower first width being substantially the same as, and not smaller than, the thickness of a portion of the associated arcuate hook member which is for mating insertion into said substantially horizontal channel, said thickness of said portion of said associated arcuate hook member being defined by a larger first radius and a smaller second radius, said larger first and smaller second radii being concentric, said larger first radius being substantially the same as, and not larger than, said large outer radius defining said associated substantially horizontal channel.

* * * * *